A. HANCE.

CAR-VENTILATOR.

No. 6,915. Reissued Feb. 8, 1876.

Witnesses.

Otto Hufeland.

Hugo Briggemann

Inventor.

A. Hance per

Van Santvoord & Hauff

Attorneys.

N. PETERS, PHOTO-LITHOGRAPHER, WASHINGTON, D. C.

UNITED STATES PATENT OFFICE.

ARCHIBALD HANCE, OF NEW YORK, N. Y.

IMPROVEMENT IN CAR-VENTILATORS.

Specification forming part of Letters Patent No. 168,897, dated October 19, 1875; reissue No. 6,915, dated February 8, 1876; application filed January 11, 1876.

*To all whom it may concern:*

Be it known that I, ARCHIBALD HANCE, of the city, county, and State of New York, have invented a new and useful Improvement in Car-Ventilators, which improvement is fully set forth in the following specification, reference being had to the accompanying drawing, in which—

Figure 1:
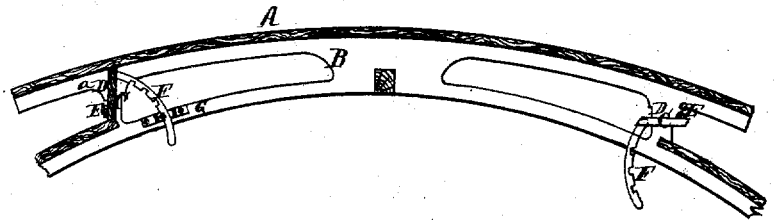
Figure 2:
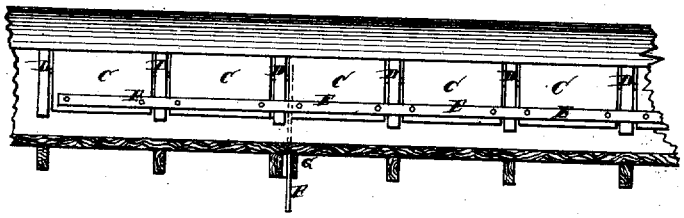

Figure 1 represents the cross-section of the roof of a street-car, showing the construction of the ventilator-valves and the mode of operating them. Fig. 2 is a side view of the roof.

Similar letters indicate corresponding parts.

This invention consists in a car-ventilator, the valves of which swing on pivots, their sides in combination with a strip or bar attached to said valves, and with the vertical posts between which the valves are hung. With these parts is further combined a segmental rack, whereby the said valves can be opened or closed simultaneously, and retained in any desired position.

In the drawing, the letter A designates the roof of a street-car, which is provided with an offset, B, in which offset the ventilators or valves C are placed. These valves are so arranged as to be vertical, or nearly so, when closed; but they may be in an inclined position. They are attached to their several openings by pivots in their ends, which have their bearings in the posts D, by which the valves are separated. E is a strip or bar of metal or other suitable material, which is attached, by nails or screws, to the outside of the valves. This bar forms a stop against the posts D when the valves are closed; and, since it connects the valves together, it allows them to be operated at the same time. A serrated segmental bar, F, which is connected to one of the valves, serves to operate the valves on each side of the car, and to lock them in any position into which they may be brought, said serrated bar being made to engage with a stop connected to the roof A.

I do not claim, broadly, a series of pivoted ventilating-valves, so connected by a bar as to be capable of simultaneous operation; but

What I claim as new, and desire to secure by Letters Patent, is—

1. The combination of the strip or bar E with a series of valves, C, swinging on pivots between posts D, and with the roof of a car, substantially as set forth.

2. In a car-ventilator, the valves C, swinging on pivots between posts D, and the strip or bar E, attached to said valves, in combination with the serrated bars F, and with the car-roof A, all constructed and operating substantially as shown and described.

In testimony that I claim the foregoing I have hereunto set my hand and seal this 10th day of January, 1876.

ARCHIBALD HANCE. [L. S.]

Witnesses:
W. HAUFF,
E. F. KASTENHUBER.